Feb. 28, 1950     J. B. DARBY     2,498,981
COMBINATION WATER AND FEED TROUGH
Filed April 22, 1946
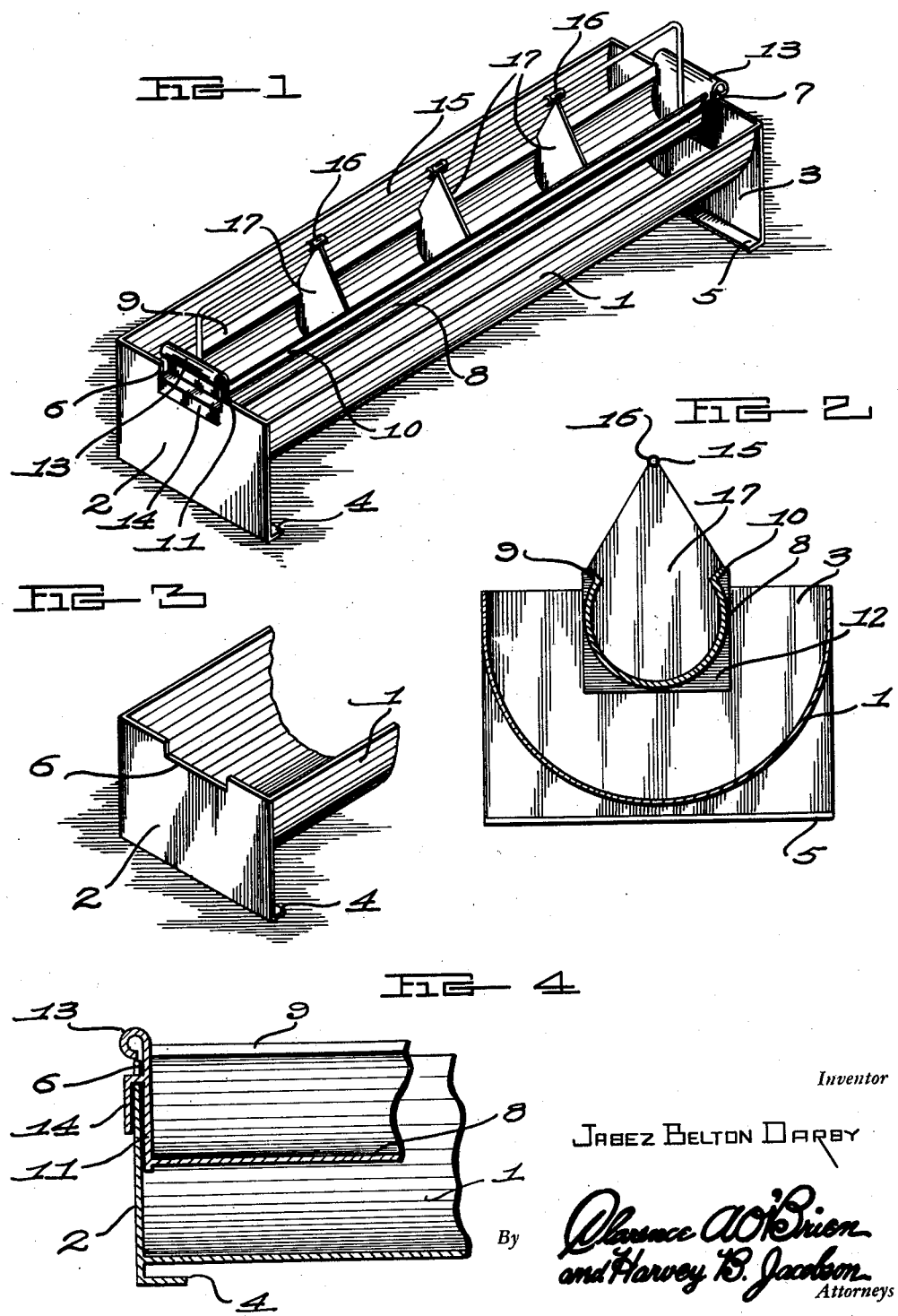
Inventor
JABEZ BELTON DARBY
By Clarence A. O'Brien
and Harvey B. Jackson
Attorneys Patented Feb. 28, 1950

2,498,981

UNITED STATES PATENT OFFICE 2,498,981

COMBINATION WATER AND FEED TROUGH

Jabez Belton Darby, Florence, Ala., assignor of one-fourth to Edna Darby, one-fourth to Mary Darby Traweek, one-fourth to Elizabeth Darby Willis, and one-fourth to Wilbur J. Darby, all of Florence, Ala.

Application April 22, 1946, Serial No. 664,116

3 Claims. (Cl. 119—51.5)

This invention relates to improvements in water and feed troughs, and more particularly to an improved water and feed trough construction which will permit a number of fowl to drink and feed without spilling or wasting any of the water or feed from the trough.

An object of the invention is to provide an improved form of combined water and feed trough for poultry which may be readily separated for filling and replenishing with water and feed, said trough being so constructed that the water trough portion thereof may be separated readily from the feed trough portion and carried to and from a water outlet for filling and replenishing without slopping or spilling the water from the said trough.

Another object of the invention is to provide an improved poultry watering and feeding trough which will be so constructed that many chickens or fowl may be watered and fed at one time, together with means for preventing the chickens or fowl from standing on the side of the trough while drinking and eating.

A further object of the invention is to provide a combined feed and watering trough construction for poultry which will include a lower feed trough being semi-circular in cross-section and a semi-circular water trough detachably supported on said feed trough, said water trough being provided with spaced baffles extending transversely thereof to prevent the water from splashing or spilling when the trough is being transported to and from a water supply for filling.

Another object of the invention is to provide an improved combined feed and water trough construction for poultry which will be highly efficient in operation and relatively inexpensive to manufacture and produce.

Other objects will appear as the description proceeds.

In the accompanying drawings which form a part of this application,

Figure 1 is a perspective view of the improved poultry feed and water trough;

Figure 2 is a transverse sectional view through the feed and water trough;

Figure 3 is a detailed perspective view partly broken away showing the feed trough, and Figure 4 is a longitudinal sectional view through one end of the combined feed and water trough construction.

Like characters of reference are used throughout the following specification and the accompanying drawings to designate corresponding parts.

In carrying out the invention, there is provided an elongated feed trough 1 which is substantially semi-circular in cross-section and closed at its opposite ends by means of the end members 2 and 3 which are bent inwardly at their lower extremities to provide the supporting feet or flanges 4 and 5, said end members 2 and 3 being suitably joined with the trough 1 by soldering or in any other desired manner.

The trough 1 is supported slightly spaced from the ground and is formed with oppositely disposed notches 6 and 7 in the upper edges of said end members 2 and 3 for purposes hereinafter described.

The water trough 8 is semi-circular in cross-section and is slightly shorter than the trough 1, and has its upper edges bent outwardly at approximately 45 degrees to form the longitudinally extending lips 9 and 10. The ends 11 and 12 for the water trough 8 are suitably secured by soldering or in any other desired manner to provide a water-tight receptacle or trough, and are formed with the outwardly curled transversely extending handles 13, and are also provided with the outwardly and downwardly extending hook portions 14 which are adapted to seat in the notches 6 and 7 formed in the upper edges of the feed trough ends 2 and 3, and extends downwardly along the outer sides thereof, forming substantially inverted U-shaped attaching and supporting members.

An inverted U-shaped wire guard rail 15 is adapted to slidably support the collars 16 which in turn support the depending baffle plates 17 which extend downwardly and outwardly to the upper edges of the water trough, and are continued to conform to the cross-sectional shape of said water trough. These baffle plates 17 are arranged to prevent the water in the water trough 8 from splashing or spilling out when the trough is being carried to a water supply to be filled or on the return trip. Any desired number of baffle plates 17 will be provided upon the guard rail 15, depending upon the length of the said trough.

The guard rail 15 is provided in order that the fowl will not stand on the edge of the feed or water trough while feeding and drinking.

It is understood that the improved poultry feed and water trough will be made from cheap tin with little expense or labor, and will be highly efficient in operation and an expense saver as the feed will not be spilled and wasted, also the water will not spill or splash over into the feed trough to ruin the same.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A combined water and feed trough construction for poultry including an outer semi-circular feed trough supported in spaced relation from the ground, a semi-circular water trough removably supported upon said feed trough concentrically therewith, said trough having vertical end plates, handles on the opposite ends of said water trough and comprising upwardly extending and returned portions of the end plates, and hook means on the ends of the water trough for engaging the top edges and outside surfaces of the ends of said feed trough for removably supporting the water trough in position thereon, said top edges having notches to receive said means, and said notches allowing finger access to the handles.

2. A combined water and feed trough construction for poultry including an outer semi-circular feed trough supported in spaced relation from the ground, a semi-circular water trough removably supported upon said feed trough concentrically therewith, handles on the opposite ends of said water trough, hook means on the ends of the water trough for engaging the top edges and outside surfaces of the ends of said feed trough for removably supporting the water trough in position thereon, a guard rail disposed in said water trough extending longitudinally thereof and above the same, and spaced baffle plates slidably supported on said guard rail, said top edges having notches to receive said means, and said notches allowing finger access to the handles.

3. A combined water and feed trough construction for poultry including an outer semi-circular feed trough supported in spaced relation from the ground, a semi-circular water trough supported upon said feed trough concentrically therewith, said trough having vertical end plates, handles on the opposite ends of said water trough and comprising upwardly extending and returned portions of the end plates, means for engaging the top edges and outside surfaces of the ends of said feed trough for removably supporting the water trough in position thereon, a guard rail of inverted U-shape and coextensive in length with the water trough disposed in said water trough extending longitudinally thereof and above the same, and spaced baffle plates having attachment collars on their upper extremities slidably positioned on said guard rail and having lower portions conforming to the cross-sectional shape of said water trough.

JABEZ BELTON DARBY.

REFERENCES CITED

The following references are of record in the file of this patent:

UNITED STATES PATENTS

| Number | Name | Date |
|---|---|---|
| 1,473,266 | Webb | Nov. 6, 1923 |
| 1,512,987 | Jorenby | Oct. 28, 1924 |
| 1,742,019 | Williams et al. | Dec. 31, 1929 |
| 1,771,647 | Moe | July 29, 1930 |
| 2,019,370 | Thomsen | Oct. 29, 1935 |

FOREIGN PATENTS

| Number | Country | Date |
|---|---|---|
| 594,478 | France | Sept. 14, 1925 |